US012596785B2

(12) United States Patent
Kirby et al.

(10) Patent No.: US 12,596,785 B2
(45) Date of Patent: Apr. 7, 2026

(54) SYSTEM AND METHOD FOR PASSWORD EXPIRATION MANAGEMENT

(71) Applicant: Bank of America Corporation, Charlotte, NC (US)

(72) Inventors: Harry Douglas Kirby, Tega Cay, SC (US); Robert Alexander Levandowski, Jr., North Granby, CT (US); Olga Caroline Kocharyan, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 135 days.

(21) Appl. No.: 18/429,749

(22) Filed: Feb. 1, 2024

(65) Prior Publication Data

US 2025/0252176 A1 Aug. 7, 2025

(51) Int. Cl.
*G06F 21/45* (2013.01)

(52) U.S. Cl.
CPC .................................... *G06F 21/45* (2013.01)

(58) Field of Classification Search
CPC ........................................................ G06F 21/45
See application file for complete search history.

(56) References Cited

U.S. PATENT DOCUMENTS

| | | | |
|---|---|---|---|
| 7,546,630 B2 | 6/2009 | Tabi | |
| 7,650,505 B1 | 1/2010 | Masurkar | |
| 7,685,430 B1 | 3/2010 | Masurkar | |
| 7,730,523 B1 | 6/2010 | Masurkar | |
| 7,992,008 B2 | 8/2011 | Ashok et al. | |
| 8,375,425 B2 | 2/2013 | Keohane et al. | |
| 8,424,067 B2 | 4/2013 | Keohane et al. | |
| 8,463,819 B2 | 6/2013 | Shashikumar et al. | |
| 8,863,253 B2 | 10/2014 | Iverson et al. | |
| 8,869,253 B2 | 10/2014 | Atkinson | |
| 8,935,805 B2 | 1/2015 | Hazlewood et al. | |
| 9,355,233 B1 * | 5/2016 | Chen ..................... | H04L 9/0891 |
| 9,396,324 B1 | 7/2016 | Gariepy et al. | |
| 9,825,938 B2 | 11/2017 | Koster | |
| 10,509,903 B2 * | 12/2019 | Sugaya ................. | G06F 21/554 |
| 10,945,127 B2 | 3/2021 | Li et al. | |
| 2006/0041756 A1 * | 2/2006 | Ashok ..................... | G06F 21/31 |
| | | | 726/26 |
| 2008/0263643 A1 | 10/2008 | Jaiswal et al. | |

(Continued)

FOREIGN PATENT DOCUMENTS

JP 2009301122 A * 12/2009

*Primary Examiner* — Joseph P Hirl
*Assistant Examiner* — Aayush Aryal

(57) ABSTRACT

A method includes sending a notification to a user device of a user that a password reset is required. A hash of a password is received from the user device at a reset date and a reset time. A default expiration date and a default expiration time are determined for the password based on the reset date and the reset time. Excluded dates, excluded time intervals, allowable dates, and allowable time intervals are determined. In response to determining that the default expiration date falls on a first excluded date, a first allowable date that is before or after the first excluded date is set as the expiration date. In response to determining that the default expiration time falls within a first excluded time interval, a time that falls within a first allowable time interval is set as the expiration time.

20 Claims, 4 Drawing Sheets

(56) References Cited

U.S. PATENT DOCUMENTS

| | | | | |
|---|---|---|---|---|
| 2009/0199294 A1* | 8/2009 | Schneider | G06F 21/316 | 726/18 |
| 2016/0028714 A1* | 1/2016 | Umberger | G06F 21/44 | 726/18 |
| 2017/0111335 A1* | 4/2017 | Hibbert | H04L 63/083 | |
| 2019/0028273 A1* | 1/2019 | Harras | G06F 21/606 | |
| 2019/0044942 A1* | 2/2019 | Gordon | H03M 13/3972 | |
| 2020/0137109 A1* | 4/2020 | Endler | H04L 63/1433 | |
| 2021/0081524 A1* | 3/2021 | Moon | G06F 21/46 | |
| 2023/0169161 A1* | 6/2023 | Konda | G06F 21/45 | 726/26 |

* cited by examiner

200

SYSTEM AND METHOD FOR PASSWORD EXPIRATION MANAGEMENT

TECHNICAL FIELD

The present disclosure relates generally to password management, and more specifically to a system and method for password expiration management.

BACKGROUND

Current password practices rely on a user to change a user's password manually after a fixed number of days since the most recent password change. Users often are unable to fit within these predetermined windows which results in unnecessary password expiration, support desk engagement, and loss of productivity.

SUMMARY

The system described in the present disclosure provides several practical applications and technical advantages that overcome the current technical problems with password management.

In general, a system includes a password management system that is operably coupled to one or more user devices of one or more users, one or more internal computing systems, and one or more external computing systems via a network. The password management system sends a notification to a user device of a user that a password reset is required. The password management system receives a hash of a password from the user device of the user at a reset date and a reset time and stores the hash of the password in a user profile of the user. The password management system determines a default expiration date based on the reset date and a default expiration time based on the reset time.

In one embodiment, the password management system determines excluded dates and excluded time intervals of the user. The password management system determines allowable dates and allowable time intervals. The password management system determines whether the default expiration date falls on an excluded date from the excluded dates. In response to determining that the default expiration date falls on the excluded date, the password management system sets an allowable date from the allowable dates that is before or after the excluded date as an expiration date for the password. In response to determining that the default expiration date does not fall on the excluded date, the password management system sets the default expiration date as the expiration date. The password management system determines whether the default expiration time falls within an excluded time interval from the excluded time intervals. In response to determining that the default expiration time falls within the excluded time interval, the password management system sets a time that falls within an allowable time interval as an expiration time for the password. In response to determining that the default expiration time does not fall within the excluded time interval, the password management system sets the default expiration time as the expiration time.

In another embodiment, the password management system determines whether a request to determine the expiration date and the expiration time for the password is received. In response to determining that the request to determine the expiration date and the expiration time for the password is received, the password management system determines a first login date and a first login time for the user. The password management system determines whether the first login date is later than the reset date. In response to determining that the first login date is later than the reset date, the password management system determines a number of days between the first login date and the reset date. The password management system shifts the expiration date forward by the number of days and shifts the expiration time to the first login time.

The password management system determines updated excluded dates and updated excluded time intervals for the user. The password management system determines updated allowable dates and updated allowable time intervals. The password management system determines whether the default expiration date falls on an updated excluded date from the updated excluded dates. In response to determining that the default expiration date falls on the updated excluded date, the password management system adjusts the expiration date to an updated allowable date from the updated allowable dates that is before or after the updated excluded date. In response to determining that the default expiration date does not fall on the updated excluded date, the password management system determines whether the default expiration time falls within an updated excluded time interval from the updated excluded time intervals. In response to determining that the default expiration time falls within the excluded time interval, the password management system adjusts the expiration time to a time that falls within an updated allowable time interval.

While determining the excluded dates and the excluded time intervals of the user, the password management system retrieves one or more data items. The one or more data items comprise data items that may affect an ability of the user to perform a password reset before or on the expiration date and the expiration time. The one or more data items may comprise one or more data items that are retrieved from the one or more internal computing systems and/or one or more data items that are retrieved from the one or more external computing systems. The password management system analyzes the one or more data items. The password management system determines a holiday schedule for the user and identifies dates associated with the holiday schedule as excluded dates. The password management system determines a time off schedule for the user and identifies dates associated with the time off schedule as excluded dates. The password management system determines a historical login behavior of the user and identifies dates associated with a reduced login frequency as excluded dates. The password management system determines a historical support desk engagement, identifies dates associated with an elevated support desk engagement as excluded dates, and identifies time intervals associated with the elevated support desk engagement as excluded time intervals. The password management system determines a maintenance schedule and identifies dates associated with the maintenance schedule as excluded dates. The password management system determines a weather forecast for the user and identifies dates with weather events that may affect the user as excluded dates. The password management system determines natural disaster information that may affect the user and identifies dates affected by a natural disaster as excluded dates. The password management system may identify other excluded dates from other sources of information that indicate that the user may not reasonably be expected to change their password on such date for reasons determined by the owner of the password management system. In certain embodiments, the password management system determines the updated excluded dates and the updated excluded time intervals for the user in a similar manner.

The present disclosure provides various advantages. The system allows for dynamically adjusting an expiration date and an expiration time of a password, such that the number of unnecessary password expirations is reduced. By reducing the number of unnecessary password expirations, loss of productivity is reduced. Furthermore, computing resources (e.g., memory, network bandwidth, etc.) and personnel resources (e.g., a support agent answering a call for password assistance) that would otherwise be used, for example, by a support desk to correct the unnecessary password expirations can be saved and used for other purposes. Accordingly, the following disclosure is particularly integrated into practical applications of: (1) dynamically adjusting an expiration date and an expiration time of a password; and (2) reducing the use of computing resources by reducing the number of unnecessary password expirations.

In one embodiment, a system includes a memory and a processor operably coupled to the memory. The memory is configured to store a user profile of a user. The user profile includes a hash of a password for the user, an expiration date for the password, and an expiration time for the password. The processor is configured to send a notification to a user device of the user that a password reset is required, receive from the user device the hash of the password at a reset date and a reset time, set the alphanumeric string as the password for the user, determine a default expiration date for the password based on the reset date, determine a default expiration time for the password based on the reset time, and determine excluded dates, excluded time intervals, allowable dates, and allowable time intervals. The excluded dates include dates that are excluded from being the expiration date for the password. The excluded time intervals include times that are excluded from being the expiration time for the password. The allowable dates include dates that can be the expiration date for the password. The allowable time intervals include times that can be the expiration time for the password. The processor is further configured to determine whether the default expiration date falls on a first excluded date of the excluded dates, and in response to determining that the default expiration date falls on the first excluded date, set a first allowable date of the allowable dates that is before or after the first excluded date as the expiration date. The processor is further configured to determine whether the default expiration time falls within a first excluded time interval of the excluded time intervals, and in response to determining that the default expiration time falls within the first excluded time interval, set a time that falls within a first allowable time interval of the allowable time intervals as the expiration time.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide effective solutions for password management. Embodiments of the present disclosure and its advantages may be understood by referring to FIGS. 1, 2A, 2B, and 3. FIGS. 1, 2A, 2B, and 3 are used to describe a system and method for password expiration management.

System Overview

Figure 1:
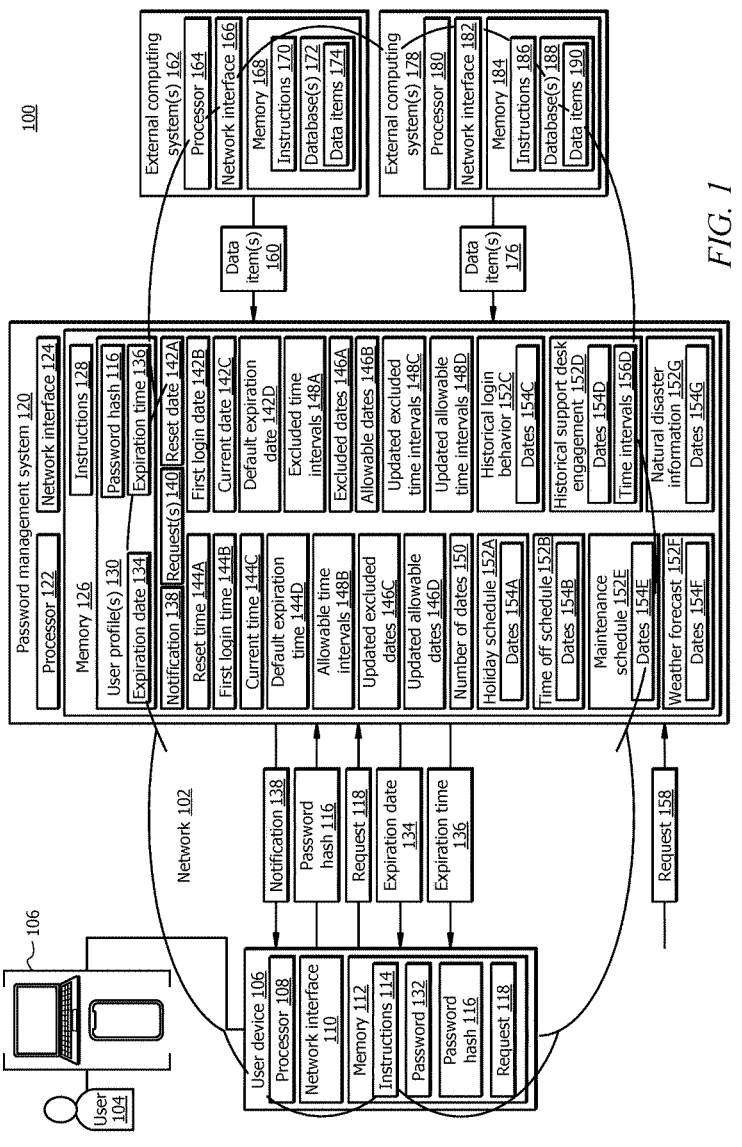
FIG. 1 illustrates an embodiment of a system configured for password expiration management.

FIG. 1 illustrates an embodiment of a system 100 that is generally configured for password expiration management. In certain embodiments, the system 100 comprises a password management system 120 that is operably coupled to one or more user devices (e.g., user device 106) of one or more users (e.g., user 104), one or more internal computing systems 162, and one or more external computing systems 178 via a network 102. Network 102 enables the communication between the components of the system 100. In other embodiments, system 100 may not have all the components listed and/or may have other elements instead of, or in addition to, those listed above.

In general, the password management system 120 sends a notification 138 to a user device 106 of a user 104 that a password reset is required. The password management system 120 receives a hash 116 of a password 132 from the user device 106 of the user 104 at a reset date 142A and a reset time 144A and stores the hash 116 of the password 132 in a memory of the password management system 120. The password management system 120 determines a default expiration date 142D based on the reset date 142A and a default expiration time 144D based on the reset time 144A.

The password management system 120 determines excluded dates 146A and excluded time intervals 148A of the user 104. The excluded dates 146A include dates that are excluded from being an expiration date for the password 132. The excluded time intervals 148A include times that are excluded from being an expiration time for the password 132. The password management system 120 determines allowable dates 146B and allowable time intervals 148B. The allowable dates 146B include dates that can be an expiration date for the password 132. The allowable time intervals 148B include times that can be an expiration time for the password 132. In certain embodiments, the allowable dates 146B are determined as dates that are not included in the excluded dates 146A and allowable time intervals 148B as time intervals that are not included in the excluded time intervals 148A.

The password management system 120 determines whether the default expiration date 142D falls on an excluded date from the excluded dates 146A. In response to determining that the default expiration date 142D falls on the excluded date, the password management system 120 sets an allowable date from the allowable dates 146B that is before or after the excluded date as an expiration date 134 for the password 132. In response to determining that the default expiration date 142D does not fall on the excluded date, the password management system 120 sets the default expiration date 142D as the expiration date 134. The password management system 120 determines whether the default expiration time 144D falls within an excluded time interval from the excluded time intervals 148A. In response to determining that the default expiration time 144D falls within the excluded time interval, the password management system 120 sets a time that falls within an allowable time interval as an expiration time 136 for the password 132. In response to determining that the default expiration time 144D does not fall within the excluded time interval, the password management system 120 sets the default expiration time 144D as the expiration time 136.

The password management system 120 determines whether a request (e.g., requests 118 or 140) to determine the expiration date 134 and the expiration time 136 for the password 132 is received. In one embodiment, the request may be an external request (e.g., request 118) received from the user device 106 of the user 104. In another embodiment, the request may be an internal request (e.g., respective one of requests 140) generated by the processor 122 of the password management system 120. The internal request may be of the requests 140 that are generated by the processor 122 of the password management system 120 in regular time intervals.

In response to determining that the request (e.g., requests 118 or 140) to determine the expiration date 134 and the expiration time 136 for the password 132 is received, the password management system 120 determines a first login date 142B and a first login time 144B for the user 104. The password management system 120 determines whether the first login date 142B is later than the reset date 142A. In response to determining that the first login date 142B is later than the reset date 142A, the password management system 120 determines a number 150 of days between the first login date 142B and the reset date 142A. The password management system 120 shifts the expiration date 134 forward by the number 150 of days and shifts the expiration time 136 to the first login time 144B.

The password management system 120 determines updated excluded dates 146C and updated excluded time intervals 148C for the user 104. The updated excluded dates 146C include dates that are excluded from being an expiration date for the password 132. The updated excluded time intervals 148C include times that are excluded from being an expiration time for the password 132. The password management system 120 determines updated allowable dates 146D and updated allowable time intervals 148D. The updated allowable dates 146D include dates that can be an expiration date for the password 132. The updated allowable time intervals 148D include times that can be an expiration time for the password 132. In certain embodiments, the updated allowable dates 146D are determined as dates that are not included in the updated excluded dates 146C and the updated allowable time intervals 148D are determined as time intervals that are not included in the updated excluded time intervals 148C.

The password management system 120 determines whether the default expiration date 142D falls on an updated excluded date from the updated excluded dates 146C. In response to determining that the default expiration date 142D falls on the updated excluded date, the password management system 120 adjusts the expiration date 134 to an updated allowable date from the updated allowable dates 146D that is before or after the updated excluded date. In response to determining that the default expiration date 142D does not fall on the updated excluded date, the password management system 120 determines whether the default expiration time 144D falls within an updated excluded time interval from the updated excluded time intervals 148C. In response to determining that the default expiration time 144D falls within the excluded time interval, the password management system 120 adjusts the expiration time 136 to a time that falls within an updated allowable time interval. The password management system 120 reports the expiration date 134 and the expiration time 136 to the user device 106 of the user 104. In embodiments when the request is an internal request (e.g., respective one of requests 140) generated by the password management system 120, the reporting processes is omitted.

While determining the excluded dates 146A and the excluded time intervals 148A of the user 104, the password management system 120 retrieves one or more data items (e.g., one or more data items 160 and/or one or more data items 176). The one or more data items comprise data items that may affect an ability of the user 104 to perform a password reset before or on the expiration date 134 and the expiration time 136. The one or more data items may comprise the one or more data items 160 that are retrieved from the one or more internal computing systems 162 and/or the one or more data items 176 that are retrieved from the one or more external computing systems 178.

The password management system 120 analyzes the one or more data items (e.g., one or more data items 160 and/or one or more data items 176). The password management system 120 determines a holiday schedule 152A for a user 104 and identifies dates 154A associated with the holiday schedule 152A as excluded dates. The password management system 120 determines a time off schedule 152B for the user 104 and identifies dates 154B associated with the time off schedule 152B as excluded dates. The password management system 120 determines a historical login behavior 152C of the user 104 and identifies dates 154C associated with a reduced login frequency as excluded dates. The password management system 120 determines a historical support desk engagement 152D, identifies dates 154D associated with an elevated support desk engagement as excluded dates, and identifies time intervals 156D associated with the elevated support desk engagement as excluded time intervals. The password management system 120 determines a maintenance schedule 152E and identifies dates 154E associated with the maintenance schedule 152E as excluded dates. The password management system 120 determines a weather forecast 152F for the user 104 and identifies dates 154F with weather events that may affect the user 104 as excluded dates. The password management system 120 determines natural disaster information 152G that may affect the user 104 and identifies dates 154F affected by a natural disaster as excluded dates. In certain embodiments, the password management system 120 determines the updated excluded dates 146C and the updated excluded time intervals 148C for the user 104 in a similar manner.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

User Device

The user device 106 is generally any computing device that are configured to process data and interact with the user 104. Examples of the user device 106 include, but are not limited to, a personal computer, a desktop computer, a workstation, a server, a laptop, a tablet computer, a mobile phone (such as a smartphone), a virtual reality headset, etc. The user device 106 may include a user interface, such as a display, a microphone, keypad, or other appropriate terminal equipment usable by the user 104.

The user device 106 further comprises a processor 108 in signal communication with a memory 112 and a network interface 110. Processor 108 may comprise one or more processors operably coupled to the memory 112. Processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 108 may be a programmable logic device, a microcontroller, a microprocessor, or any suitable combination of the preceding. The one or more processors are configured to process data and may be implemented in hardware or software. For example, processor 108 may be 8-bit, 16-bit, 32-bit, 64-bit, or of any other suitable architecture. Processor 108 is configured to implement various software instructions. For example, processor 108 is configured to execute software instructions 114 that are stored in the memory 112 in order to perform the operations described herein.

Network interface 110 is configured to enable wired and/or wireless communications (e.g., via network 102). Network interface 110 is configured to communicate data between the user device 106 and other components of the system 100. For example, network interface 110 may comprise a WIFI interface, a local area network (LAN) interface, a wide area network (WAN) interface, a modem, a switch, or a router. Network interface 110 may be configured to use any suitable type of communication protocol as would be appreciated by one of ordinary skill in the art.

Memory 112 comprises a non-transitory computer-readable medium such as one or more disks, tape drives, or solid-state drives, and may be used as an over-flow data storage device, to store programs when such programs are selected for execution, and to store instructions and data that are read during program execution. Memory 112 may be volatile or non-volatile and may comprise a read-only memory (ROM), random-access memory (RAM), ternary content-addressable memory (TCAM), dynamic random-access memory (DRAM), and static random-access memory (SRAM). Memories 112 may be implemented using one or more disks, tape drives, solid-state drives, and/or the like. Memory 112 may store any of the information described in FIGS. 1, 2A, 2B, and 3 along with any other data, instructions, logic, rules, or code operable to implement the function(s) described herein. Memory 112 is operable to store software instructions 114 and/or any other data and instructions. Software instructions 114 may comprise any suitable set of software instructions, logic, rules, or code operable to be executed by processor 108.

In operation, the processor 108 of the user device 106 is configured to receive a notification 138 that a password reset is required from the password management system 120. In response to receiving the notification 138, the processor 108 of the user device 106 is configured to receive a password 132 from the user 104 and to generate and send a hash 116 of the password 132 to the password management system 120. The processor 108 of the user device 106 is further configured to generate and send a request 118 to the password management system 120 to determine an expiration date 134 and an expiration time 136 of a password 132 of the user 104. In response to sending the request 118, the processor 108 of the user device 106 is configured to receive the expiration date 134 and the expiration time 136 from the password management system 120.

Password Management System

Password management system 120 is generally any computing device that is configured to process data and communicate with other components of the system 100 via the network 102. Password management system 120 may comprise a processor 122 in signal communication with a memory 126 and a network interface 124.

Processor 122 comprises one or more processors operably coupled to the memory 126. Processor 122 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 122 may be a programmable logic device, a microcontroller, a microprocessor, or any suitable combination of the preceding. The one or more processors are configured to process data and may be implemented in hardware or software. Processor 122 may be 8-bit, 16-bit, 32-bit, 64-bit, or of any other suitable architecture. The one or more processors are configured to implement various software instructions to perform the operations described herein. For example, the one or more processors are configured to execute software instructions 128 to perform one or more functions of the password management system 120 described herein.

Network interface 124 is configured to enable wired and/or wireless communications (e.g., via network 102). Network interface 124 is configured to communicate data between the password management system 120 and other components of the system 100. For example, network interface 124 may comprise a WIFI interface, a local area network (LAN) interface, a wide area network (WAN) interface, a modem, a switch, or a router. Processor 122 is configured to send and receive data using the network interface 124. Network interface 124 may be configured to use any suitable type of communication protocol as would be appreciated by one of ordinary skill in the art.

Memory 126 comprises a non-transitory computer-readable medium such as one or more disks, tape drives, or solid-state drives, and may be used as an over-flow data storage device, to store programs when such programs are selected for execution, and to store instructions and data that are read during program execution. Memory 126 may be volatile or non-volatile and may comprise a read-only memory (ROM), random-access memory (RAM), ternary content-addressable memory (TCAM), dynamic random-access memory (DRAM), and static random-access memory (SRAM). Memory 126 may be implemented using one or more disks, tape drives, solid-state drives, and/or the like. Memory 126 may store any of the information described in FIGS. 1, 2A, 2B, and 3 along with any other data, instructions, logic, rules, or code operable to implement the function(s) described herein. Memory 126 is operable to store software instructions 128 and/or any other data and instructions. Software instructions 128 may comprise any suitable set of software instructions, logic, rules, or code operable to be executed by processor 122. Memory 126 is further configured to store one or more user profiles 130 that correspond to one or more user (e.g., user 104). The user profile 130 may comprise a hash 116 of a password 132, an expiration date 134, and an expiration time. In certain embodiments, the user 104 is allowed access to the one or more internal computing systems 162 using the password 132.

In operation, the processor 122 of the password management system 120 sends a notification 138 to a user device 106 of a user 104 that a password reset is required. The processor 122 of the password management system 120 receives a hash 116 of a password 132 from the user device 106 of the user 104 at a reset date 142A and a reset time 144A and stores the hash 116 of the password 132 in the user profile 130 of the user 104. The processor 122 of the password management system 120 determines a default expiration date 142D based on the reset date 142A. In certain embodiments, the processor 122 of the password management system 120 determines a date that is 30, 60, 90, 120, or 180 days from the reset date 142A as the default expiration date 142D. The processor 122 of the password management system 120 determines a default expiration time 144D based on the reset time 144A. In certain embodiments, the processor 122 of the password management system 120 determines the reset time 144A as the default expiration time 144D.

The processor 122 of the password management system 120 determines excluded dates 146A and excluded time intervals 148A of the user 104. The excluded dates 146A include dates that are excluded from being an expiration date for the password 132. The excluded time intervals 148A include times that are excluded from being an expiration time for the password 132. The processor 122 of the password management system 120 determines allowable dates 146B and allowable time intervals 148B. The allowable dates 146B include dates that can be an expiration date for the password 132. The allowable time intervals 148B include times that can be an expiration time for the password 132. In certain embodiments, the allowable dates 146B are determined as dates that are not included in the excluded dates 146A and allowable time intervals 148B as time intervals that are not included in the excluded time intervals 148A.

The processor 122 of the password management system 120 determines whether the default expiration date 142D falls on an excluded date from the excluded dates 146A. In response to determining the default expiration date 142D falls on the excluded date, the processor 122 of the password management system 120 sets an allowable date from the allowable dates 146B that is before or after the excluded date as an expiration date 134 for the password 132. In one embodiment, the allowable date may be immediately before the excluded date. In another embodiment, the allowable date may be immediately after the excluded date. In response to determining that the default expiration date 142D does not fall on the excluded date, the processor 122 of the password management system 120 sets the default expiration date 142D as the expiration date 134.

The processor 122 of the password management system 120 determines whether the default expiration time 144D falls within an excluded time interval from the excluded time intervals 148A. In response to determining that the default expiration time 144D falls within the excluded time interval, the processor 122 of the password management system 120 sets a time that falls within an allowable time interval as an expiration time 136 for the password 132. In response to determining that the default expiration time 144D does not fall within the excluded time interval, the processor 122 of the password management system 120 sets the default expiration time 144D as the expiration time 136.

The processor 122 of the password management system 120 determines whether a request (e.g., requests 118 or 140) to determine the expiration date 134 and the expiration time 136 for the password 132 is received. In one embodiment, the request may be an external request (e.g., request 118) received from the user device 106 of the user 104. In another embodiment, the request may be an internal request (e.g., respective one of requests 140) generated by the processor 122 of the password management system 120. The internal request may be of the requests 140 that are generated by the processor 122 of the password management system 120 in regular time intervals.

In response to determining that the request (e.g., requests 118 or 140) to determine the expiration date 134 and the expiration time 136 for the password 132 is received, the processor 122 of the password management system 120 determines a first login date 142B and a first login time 144B for the user 104. The processor 122 of the password management system 120 determines whether the first login date 142B is later than the reset date 142A. In response to determining that the first login date 142B is later than the reset date 142A, the processor 122 of the password management system 120 determines a number 150 of days between the first login date 142B and the reset date 142A. The processor 122 of the password management system 120 shifts the expiration date 134 forward by the number 150 of days. The processor 122 of the password management system 120 shifts the expiration time 136 to the first login time 144B.

The processor 122 of the password management system 120 determines updated excluded dates 146C and updated excluded time intervals 148C for the user 104. The updated excluded dates 146C include dates that are excluded from being an expiration date for the password 132. The updated excluded time intervals 148C include times that are excluded from being an expiration time for the password 132. The processor 122 of the password management system 120 determines updated allowable dates 146D and updated allowable time intervals 148D. The updated allowable dates 146D include dates that can be an expiration date for the password 132. The updated allowable time intervals 148D include times that can be an expiration time for the password 132. In certain embodiments, the updated allowable dates 146D are determined as dates that are not included in the updated excluded dates 146C and the updated allowable time intervals 148D are determined as time intervals that are not included in the updated excluded time intervals 148C.

The processor 122 of the password management system 120 determines whether the default expiration date 142D falls on an updated excluded date from the updated excluded dates 146C. In response to determining that the default expiration date 142D falls on the updated excluded date, the processor 122 of the password management system 120 adjusts the expiration date 134 to an updated allowable date from the updated allowable dates 146D that is before or after the updated excluded date. In one embodiment, the updated allowable date may be immediately before the updated excluded date. In another embodiment, the updated allowable date may be immediately after the updated excluded date. In response to determining that the default expiration date 142D does not fall on the updated excluded date, the processor 122 of the password management system 120 determines whether the default expiration time 144D falls within an updated excluded time interval from the updated excluded time intervals 148C. In response to determining that the default expiration time 144D falls within the excluded time interval, the processor 122 of the password management system 120 adjusts the expiration time 136 to a time that falls within an updated allowable time interval. The processor 122 of the password management system 120 reports the expiration date 134 and the expiration time 136 to the user device 106 of the user 104. In embodiments when the request is an internal request (e.g., respective one of requests 140) generated by the processor 122 of the password management system 120, the reporting processes is omitted.

While determining the excluded dates 146A and the excluded time intervals 148A of the user 104, the processor 122 of the password management system 120 retrieves one or more data items (e.g., one or more data items 160 and/or one or more data items 176). The one or more data items comprise data items that may affect an ability of the user 104 to perform a password reset before or on the expiration date 134 and the expiration time 136. The one or more data items may comprise the one or more data items 160 that are retrieved from the one or more internal computing systems 162 and/or the one or more data items 176 that are retrieved from the one or more external computing systems 178.

The processor 122 of the password management system 120 analyzes the one or more data items (e.g., one or more data items 160 and/or one or more data items 176). The processor 122 of the password management system 120 determines a holiday schedule 152A for a user 104 and identifies dates 154A associated with the holiday schedule 152A as excluded dates. The processor 122 of the password management system 120 determines a time off schedule 152B for the user 104 and identifies dates 154B associated with the time off schedule 152B as excluded dates. The processor 122 of the password management system 120 determines a historical login behavior 152C of the user 104 and identifies dates 154C associated with a reduced login frequency as excluded dates. The processor 122 of the password management system 120 determines a historical support desk engagement 152D, identifies dates 154D associated with an elevated support desk engagement as excluded dates, and identifies time intervals 156D associated with the elevated support desk engagement as excluded time intervals. The processor 122 of the password management system 120 determines a maintenance schedule 152E and identifies dates 154E associated with the maintenance schedule 152E as excluded dates. The processor 122 of the password management system 120 determines a weather forecast 152F for the user 104 and identifies dates 154F with weather events that may affect the user 104 as excluded dates. The processor 122 of the password management system 120 determines natural disaster information 152G that may affect the user 104 and identifies dates 154F affected by a natural disaster as excluded dates. In certain embodiments, the processor 122 of the password management system 120 determines the updated excluded dates 146C and the updated excluded time intervals 148C for the user 104 in a similar manner.

Internal Computing Systems

Each of one or more internal computing systems 162 are generally any computing device that is configured to process data and communicate with other components of the system 100 via the network 102. In certain embodiments, the one or more internal computing systems 162 is configured to allow access to the user 104 using the password 132. The internal computing system 162 may comprise a processor 164 in signal communication with a memory 168 and a network interface 166.

Processor 164 comprises one or more processors operably coupled to the memory 168. Processor 164 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 164 may be a programmable logic device, a microcontroller, a microprocessor, or any suitable combination of the preceding. The one or more processors are configured to process data and may be implemented in hardware or software. Processor 164 may be 8-bit, 16-bit, 32-bit, 64-bit, or of any other suitable architecture. The one or more processors are configured to implement various software instructions to perform the operations described herein. For example, the one or more processors are configured to execute software instructions 170 to perform one or more functions of the internal computing system 162 described herein.

Network interface 166 is configured to enable wired and/or wireless communications (e.g., via network 102). Network interface 166 is configured to communicate data between the internal computing system 162 and other components of the system 100. For example, the network interface 166 may comprise a WIFI interface, a local area network (LAN) interface, a wide area network (WAN) interface, a modem, a switch, or a router. Processor 164 is configured to send and receive data using the network interface 166. Network interface 166 may be configured to use any suitable type of communication protocol as would be appreciated by one of ordinary skill in the art Memory 168 comprises a non-transitory computer-readable medium such as one or more disks, tape drives, or solid-state drives, and may be used as an over-flow data storage device, to store programs when such programs are selected for execution, and to store instructions and data that are read during program execution. Memory 168 may be volatile or non-volatile and may comprise a read-only memory (ROM), random-access memory (RAM), ternary content-addressable memory (TCAM), dynamic random-access memory (DRAM), and static random-access memory (SRAM). Memory 168 may be implemented using one or more disks, tape drives, solid-state drives, and/or the like. Memory 168 may store any of the information described in FIGS. 1, 2A, 2B, and 3 along with any other data, instructions, logic, rules, or code operable to implement the function(s) described herein. Memory 168 is operable to store software instructions 170 and/or any other data and instructions. Software instructions 170 may comprise any suitable set of software instructions, logic, rules, or code operable to be executed by processor 164.

Memory 126 is further configured to store one or more databases 172. The one or more databases 172 comprise a plurality of data items 174. The one or more databases 172 may include various calendar databases (e.g., comprising a holiday schedule, a time off schedule, a maintenance schedule, and/or the like), an active directory database (e.g., comprising login data for one or more users), a support desk database (e.g., comprising support desk engagement data), and/or the like.

External Computing System

The external computing system 178 is generally any computing device that is configured to process data and communicate with other components of the system 100 via the network 102. The external computing system 178 may comprise a processor 180 in signal communication with a memory 184 and a network interface 182.

Processor 180 comprises one or more processors operably coupled to the memory 184. Processor 180 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 180 may be a programmable logic device, a microcontroller, a micropro- cessor, or any suitable combination of the preceding. The one or more processors are configured to process data and may be implemented in hardware or software. Processor 180 may be 8-bit, 16-bit, 32-bit, 64-bit, or of any other suitable architecture. The one or more processors are configured to implement various software instructions to perform the operations described herein. For example, the one or more processors are configured to execute software instructions 186 to perform one or more functions of the external computing system 178 described herein.

Network interface 182 is configured to enable wired and/or wireless communications (e.g., via network 102). Network interface 182 is configured to communicate data between the external computing system 178 and other components of the system 100. For example, the network interface 182 may comprise a WIFI interface, a local area network (LAN) interface, a wide area network (WAN) interface, a modem, a switch, or a router. Processor 180 is configured to send and receive data using the network interface 182. Network interface 182 may be configured to use any suitable type of communication protocol as would be appreciated by one of ordinary skill in the art.

Memory 184 comprises a non-transitory computer-read- able medium such as one or more disks, tape drives, or solid-state drives, and may be used as an over-flow data storage device, to store programs when such programs are selected for execution, and to store instructions and data that are read during program execution. Memory 184 may be volatile or non-volatile and may comprise a read-only memory (ROM), random-access memory (RAM), ternary content-addressable memory (TCAM), dynamic random- access memory (DRAM), and static random-access memory (SRAM). Memory 184 may be implemented using one or more disks, tape drives, solid-state drives, and/or the like. Memory 184 may store any of the information described in FIGS. 1, 2A, 2B, and 3 along with any other data, instruc- tions, logic, rules, or code operable to implement the func- tion(s) described herein. Memory 184 is operable to store software instructions 186 and/or any other data and instruc- tions. Software instructions 186 may comprise any suitable set of software instructions, logic, rules, or code operable to be executed by processor 180.

Memory 184 is further configured to store one or more databases 188. The one or more databases 188 comprise a plurality of data items 190. The one or more databases 188 may include a weather forecast database, a natural disaster database, and/or the like.

Example Method for Password Expiration Management

Figure 2A:
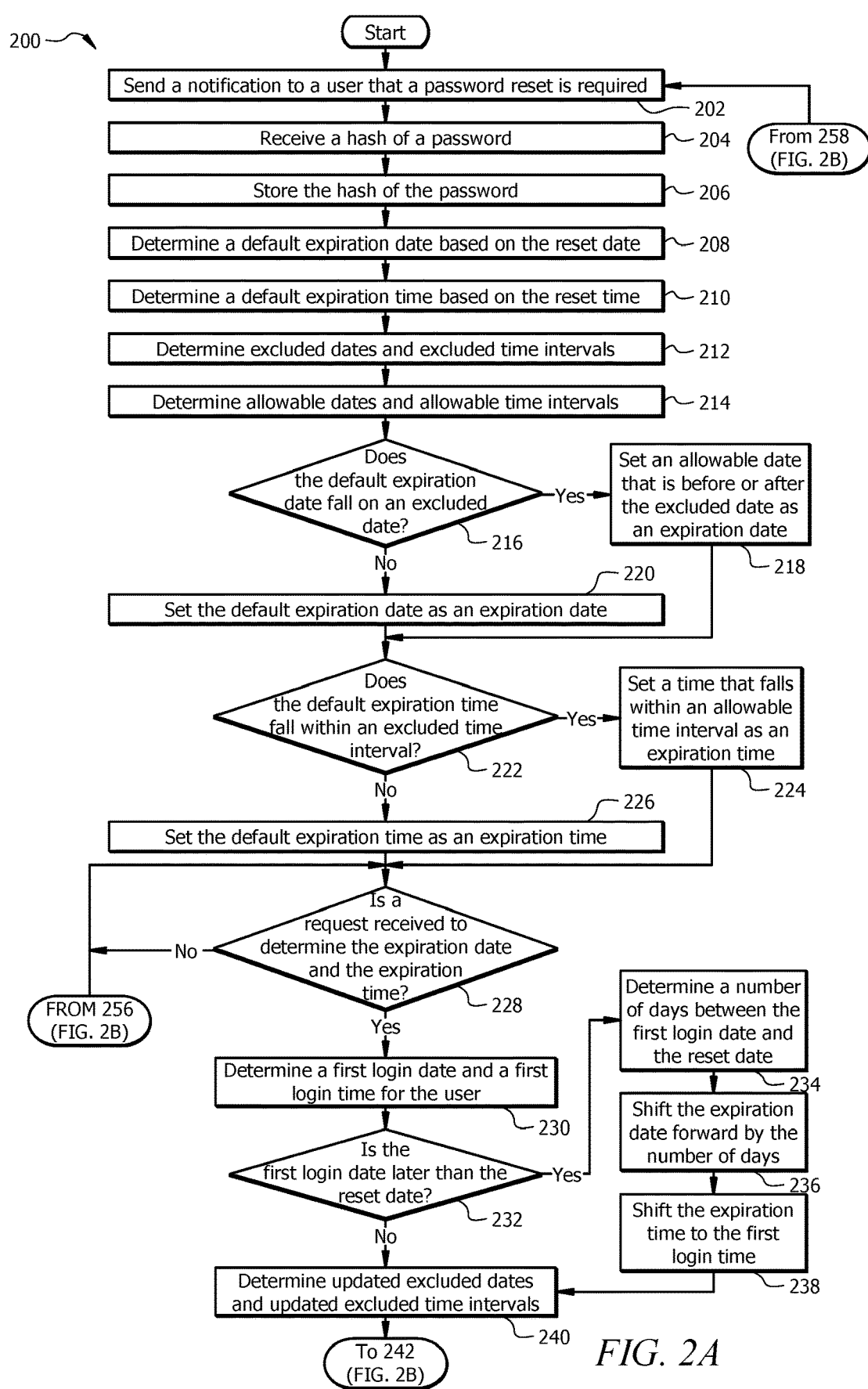
FIGS. 2A and 2B illustrate an example operational flow of system of FIG. 1 for password expiration management.
Figure 2B:
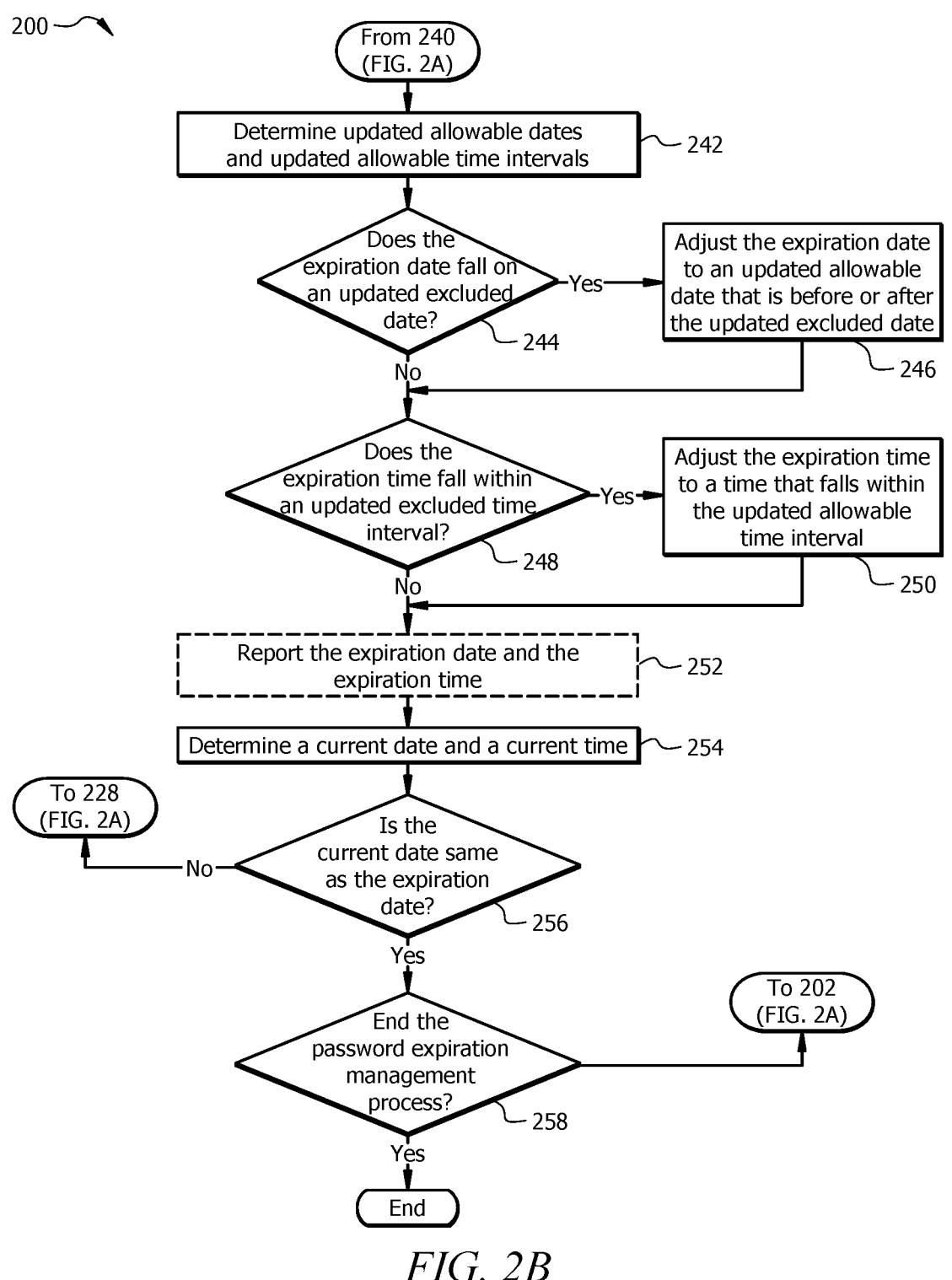

FIGS. 2A and 2B illustrate an example flowchart of a method 200 for password expiration management. Modifi- cations, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software instructions 114, 128, 170, and/or 186 of FIG. 1), stored on non-transitory, tangible, machine-readable medium (e.g., memories 112, 126, 168, and/or 184 of FIG. 1) that when executed by one or more processors (e.g., processors 108, 122, 164, and/or 180 of FIG. 1) may cause the one or more processors to perform operations 202-258.

Method 200 starts with operation 202, where a processor 122 of a password management system 120 sends a notifi- cation 138 to a user device 106 of a user 104 that a password reset is required. At operation 204, the processor 122 of the password management system 120 receives a hash 116 of a password 132 from the user device 106 of the user 104 at a reset date 142A and a reset time 144A. At operation 206, the processor 122 of the password management system 120 stores the hash 116 of the password 132 in a user profile 130 of the user 104 that is stored in a memory 126 of the password management system 120.

At operation 208, the processor 122 of the password management system 120 determines a default expiration date 142D based on the reset date 142A. In certain embodi- ments, the processor 122 of the password management system 120 determines a date that is 30, 60, 90, 120, or 180 days from the reset date 142A as the default expiration date 142D. At operation 210, the processor 122 of the password management system 120 determines a default expiration time 144D based on the reset time 144A. In certain embodi- ments, the processor 122 of the password management system 120 determines the reset time 144A as the default expiration time 144D.

At operation 212, the processor 122 of the password management system 120 determines excluded dates 146A and excluded time intervals 148A of the user 104. The excluded dates 146A include dates that are excluded from being an expiration date for the password 132. The excluded time intervals 148A include times that are excluded from being an expiration time for the password 132. In certain embodiments, the excluded dates 146A and the excluded time intervals 148A may be determined using a method 300 described below with reference to FIG. 3.

At operation 214, the processor 122 of the password management system 120 determines allowable dates 146B and allowable time intervals 148B. The allowable dates 146B include dates that can be an expiration date for the password 132. The allowable time intervals 148B include times that can be an expiration time for the password 132. In certain embodiments, the allowable dates 146B are deter- mined as dates that are not included in the excluded dates 146A and allowable time intervals 148B as time intervals that are not included in the excluded time intervals 148A.

At operation 216, the processor 122 of the password management system 120 determines whether the default expiration date 142D falls on an excluded date from the excluded dates 146A. In response to determining at opera- tion 216 that the default expiration date 142D falls on the excluded date, method 200 proceeds to operation 218. At operation 218, the processor 122 of the password manage- ment system 120 sets an allowable date from the allowable dates 146B that is before or after the excluded date as an expiration date 134 for the password 132. In one embodi- ment, the allowable date may be immediately before the excluded date. In another embodiment, the allowable date may be immediately after the excluded date. After perform- ing operation 218, method 200 proceeds to operation 222. In response to determining at operation 216 that the default expiration date 142D does not fall on the excluded date, method 200 proceeds to operation 220. At operation 220, the processor 122 of the password management system 120 sets the default expiration date 142D as the expiration date 134. After performing operation 220, method 200 proceeds to operation 222.

At operation 222, the processor 122 of the password management system 120 determines whether the default expiration time 144D falls within an excluded time interval from the excluded time intervals 148A. In response to determining at operation 222 that the default expiration time 144D falls within the excluded time interval, method 200 proceeds to operation 224. At operation 224, the processor 122 of the password management system 120 sets a time that falls within an allowable time interval as an expiration time 136 for the password 132. After performing operation 224, method 200 proceeds to operation 228. In response to determining at operation 222 that the default expiration time 144D does not fall within the excluded time interval, method 200 proceeds to operation 226. At operation 226, the processor 122 of the password management system 120 sets the default expiration time 144D as the expiration time 136. After performing operation 226, method 200 proceeds to operation 228.

At operation 228, the processor 122 of the password management system 120 determines whether a request (e.g., requests 118 or 140 of FIG. 1) to determine the expiration date 134 and the expiration time 136 for the password 132 is received. In certain embodiments, operation 228 may be repeated one or more times until the request (e.g., requests 118 or 140 of FIG. 1) to determine the expiration date 134 and the expiration time 136 for the password 132 is received. In one embodiment, the request may be an external request (e.g., request 118) received from the user device 106 of the user 104. In another embodiment, the request may be an internal request (e.g., respective one of requests 140) generated by the processor 122 of the password management system 120. The internal request may be of the requests 140 that are generated by the processor 122 of the password management system 120 in regular time intervals.

In response to determining at operation 228 that the request (e.g., requests 118 or 140 of FIG. 1) to determine the expiration date 134 and the expiration time 136 for the password 132 is received, method 200 proceeds to operation 230. At operation 230, the processor 122 of the password management system 120 determines a first login date 142B and a first login time 144B for the user 104. At operation 232, the processor 122 of the password management system 120 determines whether the first login date 142B is later than the reset date 142A.

In response to determining at operation 232 that the first login date 142B is later than the reset date 142A, method 200 proceeds to operation 234. At operation 234, the processor 122 of the password management system 120 determines a number 150 of days between the first login date 142B and the reset date 142A. At operation 236, the processor 122 of the password management system 120 shifts the expiration date 134 forward by the number 150 of days. At operation 238, the processor 122 of the password management system 120 shifts the expiration time 136 to the first login time 144B. After performing operation 238 or in response to determining at operation 232 that the first login date 142B is not later than the reset date 142A, method 200 proceeds to operation 240.

At operation 240, the processor 122 of the password management system 120 determines updated excluded dates 146C and updated excluded time intervals 148C for the user 104. The updated excluded dates 146C include dates that are excluded from being an expiration date for the password 132. The updated excluded time intervals 148C include times that are excluded from being an expiration time for the password 132. In certain embodiments, the updated excluded dates 146C and the updated excluded time intervals 148C may be determined using a method 300 described below with reference to FIG. 3.

At operation 242, the processor 122 of the password management system 120 determines updated allowable dates 146D and updated allowable time intervals 148D. The updated allowable dates 146D include dates that can be an expiration date for the password 132. The updated allowable time intervals 148D include times that can be an expiration time for the password 132. In certain embodiments, the updated allowable dates 146D are determined as dates that are not included in the updated excluded dates 146C and the updated allowable time intervals 148D are determined as time intervals that are not included in the updated excluded time intervals 148C.

At operation 244, the processor 122 of the password management system 120 determines whether the default expiration date 142D falls on an updated excluded date from the updated excluded dates 146C. In response to determining at operation 244 that the default expiration date 142D falls on the updated excluded date, method 200 proceeds to operation 246. At operation 246, the processor 122 of the password management system 120 adjusts the expiration date 134 to an updated allowable date from the updated allowable dates 146D that is before or after the updated excluded date. In one embodiment, the updated allowable date may be immediately before the updated excluded date. In another embodiment, the updated allowable date may be immediately after the updated excluded date.

After performing operation 246 or in response to determining at operation 244 that the default expiration date 142D does not fall on the updated excluded date, method 200 proceeds to operation 248. At operation 248, the processor 122 of the password management system 120 determines whether the default expiration time 144D falls within an updated excluded time interval from the updated excluded time intervals 148C. In response to determining at operation 248 that the default expiration time 144D falls within the excluded time interval, method 200 proceeds to operation 250. At operation 250, the processor 122 of the password management system 120 adjusts the expiration time 136 to a time that falls within an updated allowable time interval.

After performing operation 250 or in response to determining at operation 248 that the default expiration time 144D does not fall within the excluded time interval, method 200 proceeds to operation 252. At operation 252, the processor 122 of the password management system 120 reports the expiration date 134 and the expiration time 136 to the user device 106 of the user 104. In embodiments when the request received at operation 228 is an internal request (e.g., respective one of requests 140) generated by the processor 122 of the password management system 120, operation 252 is omitted. At operation 254, the processor 122 of the password management system 120 determines a current date 142C and a current time 144C.

At operation 256, the processor 122 of the password management system 120 determines whether the current date 142C is same as the expiration date 134. In response to determining at operation 256 that the current date 142C is different from the expiration date 134, method 200 proceeds to operation 228. In certain embodiments, operations 228 through 256 may be repeated one or more times until the current date 142C is same as the expiration date 134. In response to determining at operation 256 that the current date 142C is same as the expiration date 134, method 200 proceeds to operation 258. At operation 258, the processor 122 of the password management system 120 determines whether a request 158 is received to end the password expiration management process. In response to determining at operation 258 that the request 158 to end the password expiration management process is not received, method 200 proceeds to operation 202. In certain embodiments, operations 202 through 258 may be repeated one or more times until the request 158 to end the password expiration management process is received. In response to determining at operation 258 that the request 158 to end the password expiration management process is received, method 200 proceeds to end.

Example Method for Determining Excluded Dates and Excluded Time Intervals

Figure 3:
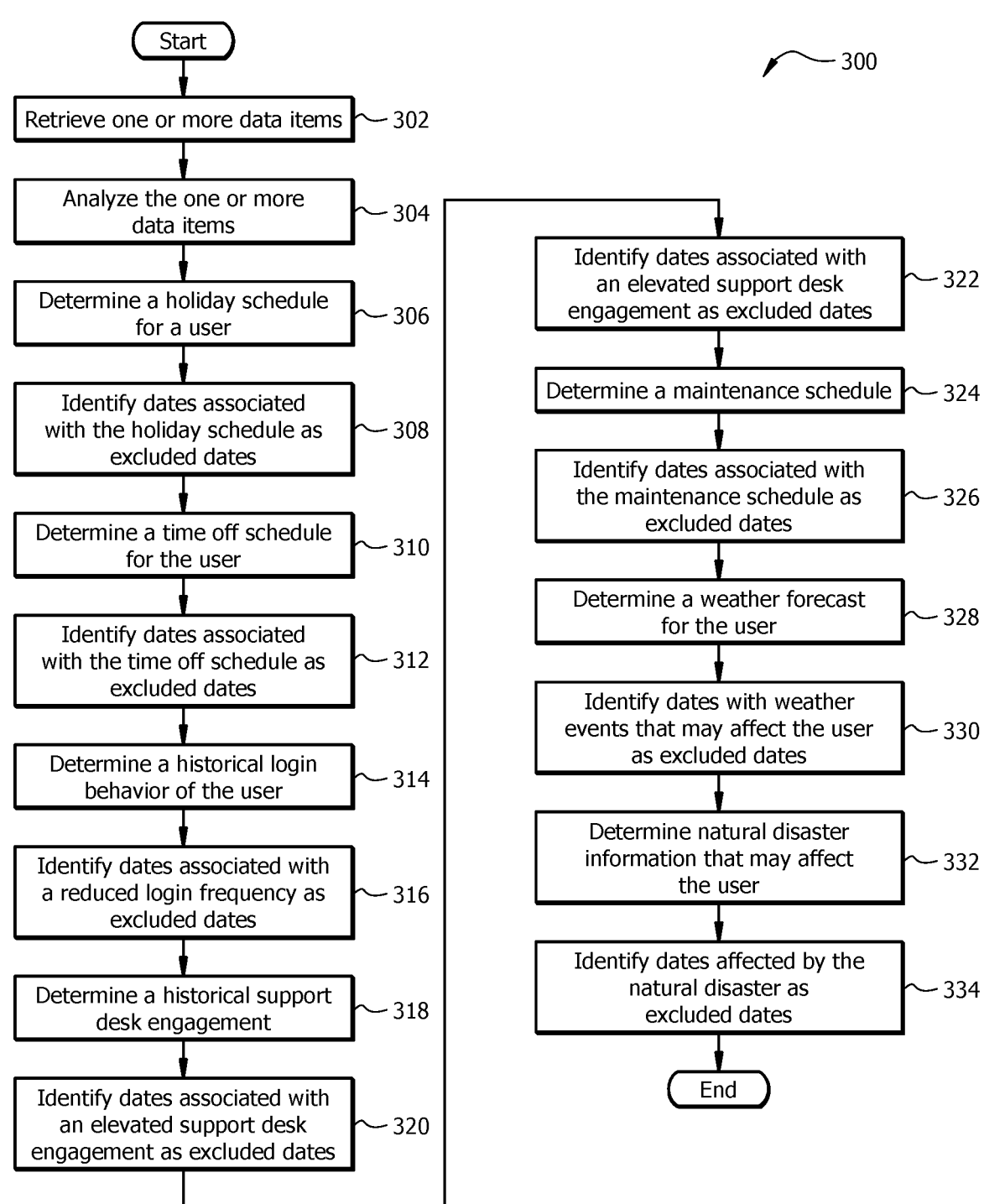
FIG. 3 illustrates an example operational flow of system of FIG. 1 for determining excluded dates and excluded time intervals.

FIG. 3 illustrates an example flowchart of a method 300 for determining excluded dates and excluded time intervals. Modifications, additions, or omissions may be made to method 200. Method 300 may include more, fewer, or other operations. For example, operations may be performed in parallel or in any suitable order. For example, one or more operations of method 300 may be implemented, at least in part, in the form of the software instructions (e.g., software instructions 114, 128, 170, and/or 186 of FIG. 1), stored on non-transitory, tangible, machine-readable medium (e.g., memories 112, 126, 168, and/or 184 of FIG. 1) that when executed by one or more processors (e.g., processors 108, 122, 164, and/or 180 of FIG. 1) may cause the one or more processors to perform operations 302-334.

Method 300 starts with operation 302, where the processor 122 of the password management system 120 retrieves one or more data items (e.g., one or more data items 160 and/or one or more data items 176 of FIG. 1). The one or more data items comprise data items that may affect an ability of the user 104 to perform a password reset before or on the expiration date 134 and the expiration time 136. The one or more data items may comprise the one or more data items 160 that are retrieved from the one or more internal computing systems 162 and/or the one or more data items 176 that are retrieved from the one or more external computing systems 178.

At operation 304, the processor 122 of the password management system 120 analyzes the one or more data items (e.g., one or more data items 160 and/or one or more data items 176 of FIG. 1). At operation 306, the processor 122 of the password management system 120 determines a holiday schedule 152A for a user 104. At operation 308, the processor 122 of the password management system 120 identifies dates 154A associated with the holiday schedule 152A as excluded dates. At operation 310, the processor 122 of the password management system 120 determines a time off schedule 152B for the user 104. At operation 312, the processor 122 of the password management system 120 identifies dates 154B associated with the time off schedule 152B as excluded dates. At operation 314, the processor 122 of the password management system 120 determines a historical login behavior 152C of the user 104. At operation 316, the processor 122 of the password management system 120 identifies dates 154C associated with a reduced login frequency as excluded dates. At operation 318, the processor 122 of the password management system 120 determines a historical support desk engagement 152D. At operation 320, the processor 122 of the password management system 120 identifies dates 154D associated with an elevated support desk engagement as excluded dates. At operation 322, the processor 122 of the password management system 120 identifies time intervals 156D associated with the elevated support desk engagement as excluded time intervals. At operation 324, the processor 122 of the password management system 120 determines a maintenance schedule 152E. At operation 326, the processor 122 of the password management system 120 identifies dates 154E associated with the maintenance schedule 152E as excluded dates. At operation 328, the processor 122 of the password management system 120 determines a weather forecast 152F for the user 104. At operation 330, the processor 122 of the password management system 120 identifies dates 154F with weather events that may affect the user 104 as excluded dates. At operation 332, the processor 122 of the password management system 120 determines natural disaster information 152G that may affect the user 104. At operation 334, the processor 122 of the password management system 120 identifies dates 154F affected by the natural disaster as excluded dates. After performing operation 334, method 300 proceeds to end.

Method 300 may be used to implement operations 212 and 240 of method 200 of FIGS. 2A and 2B. While implementing operation 212, method 300 retrieves one or more first data items from the one or more internal computing systems 162 and/or the one or more external computing systems 178 at a first time. While implementing operation 240, method 300 retrieves one or more second data items from the one or more internal computing systems 162 and/or the one or more external computing systems 178 at a second time that is later than the first time. In certain embodiments, the one or more first data items are different from the one or more second data items due to updates that may be received by the one or more internal computing systems 162 and/or the one or more external computing systems 178 between the first time and the second time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
   a memory configured to store a user profile of a user, wherein the user profile comprises:

a hash of a password for the user;

an expiration date for the password; and an expiration time for the password; and a processor operably coupled to the memory and configured to:

send a notification to a user device of the user that a password reset is required;

receive from the user device the hash of the password at a reset date and a reset time;

determine a default expiration date for the password based on the reset date;

determine a default expiration time for the password based on the reset time;

determine excluded dates, wherein the excluded dates comprise dates that are excluded from being the expiration date for the password;

determine excluded time intervals, wherein the excluded time intervals comprise times that are excluded from being the expiration time for the password;

determine allowable dates, wherein the allowable dates comprise dates that can be the expiration date for the password;

determine allowable time intervals, wherein the allowable time intervals comprise times that can be the expiration time for the password;

determine whether the default expiration date falls on a first excluded date of the excluded dates;

in response to determining that the default expiration date falls on the first excluded date, set a first allowable date of the allowable dates that is before or after the first excluded date as the expiration date;

determine whether the default expiration time falls within a first excluded time interval of the excluded time intervals;

in response to determining that the default expiration time falls within the first excluded time interval, set a first allowable time that falls within a first allowable time interval of the allowable time intervals as the expiration time;

after setting the first allowable date and the first allowable time, receive a request to determine a new expiration date for the password;

in response to receiving the request, determine a first login date for the user;

if the first login date is later than the reset date:

determine a number of days between the first login date and the reset date; and shift the first allowable date by the determined number of days to generate the new expiration date.

2. The system of claim 1, wherein the processor is further configured to:

in response to determining that the default expiration date does not fall on the first excluded date, set the default expiration date as the expiration date; and in response to determining that the default expiration time does not fall within the first excluded time interval, set the default expiration time as the expiration time.

3. The system of claim 1, wherein determining the excluded dates and the excluded time intervals comprises:

analyzing one or more data items, wherein the one or more data items comprise data times that affect an ability of the user to perform the password reset before or on the expiration date and the expiration time;

determining a holiday schedule for the user;

identifying dates associated with the holiday schedule as excluded dates;

determining a time off schedule for the user;

identifying dates associated with the time off schedule as excluded dates;

determining a historical login behavior for the user;

identifying dates associated with a reduced login frequency as excluded dates;

determining a historical support desk engagement;

identifying dates associated with an elevate support desk engagement as excluded dates;

determining a maintenance schedule; and identifying dates associated with the maintenance schedule as excluded dates.

4. The system of claim 3, wherein determining the excluded dates and the excluded time intervals further comprises:

determining a weather forecast for the user;

identifying dates associated with weather events that may affect the user as excluded dates;

determining natural disaster information that may affect the user; and identifying dates affected by a natural disaster as excluded dates.

5. The system of claim 1, wherein the processor is further configured to:

determine whether a request to determine the expiration date and the expiration time is received; and in response to determining that the request to determine the expiration date and the expiration time is received:

determine updated excluded dates and updated excluded time intervals;

determine updated allowable dates and updated allowable time intervals;

determine whether the expiration date falls on a first updated excluded date of the updated excluded dates;

in response to determining that the expiration date falls on the first updated excluded date, adjust the expiration date to a first updated allowable date of the updated allowable dates that is before or after the first updated excluded date;

determine whether the expiration time falls within a first updated excluded time interval of the updated excluded time intervals; and in response to determining that the expiration time falls within the first updated excluded time interval, adjust the expiration time to a time that falls within a first updated allowable time interval of the updated allowable time intervals.

6. The system of claim 5, wherein determining the updated excluded dates and the updated excluded time intervals comprises:

analyzing one or more data items, wherein the one or more data items comprise data times that affect an ability of the user to perform the password reset before or on the expiration date and the expiration time;

determining a holiday schedule for the user;

identifying dates associated with the holiday schedule as updated excluded dates;

determining a time off schedule for the user;

identifying dates associated with the time off schedule as updated excluded dates;

determining a historical login behavior for the user;

identifying dates associated with a reduced login frequency as updated excluded dates;

determining a historical support desk engagement;

identifying dates associated with an elevate support desk engagement as updated excluded dates;

determining a maintenance schedule; and identifying dates associated with the maintenance schedule as updated excluded dates.

7. The system of claim 6, wherein determining the updated excluded dates and the updated excluded time intervals further comprises:

determining a weather forecast for the user;

identifying dates associated with weather events that may affect the user as updated excluded dates;

determining natural disaster information that may affect the user; and identifying dates affected by a natural disaster as updated excluded dates.

8. A method comprising:

sending a notification to a user device of a user that a password reset is required;

receiving from the user device a hash of a password at a reset date and a reset time;

determining a default expiration date for the password based on the reset date;

determining a default expiration time for the password based on the reset time;

determining excluded dates, wherein the excluded dates comprise dates that are excluded from being an expiration date for the password;

determining excluded time intervals, wherein the excluded time intervals comprise times that are excluded from being an expiration time for the password;

determining allowable dates, wherein the allowable dates comprise dates that can be the expiration date for the password;

determining allowable time intervals, wherein the allowable time intervals comprise times that can be the expiration time for the password;

determining whether the default expiration date falls on a first excluded date of the excluded dates;

in response to determining that the default expiration date falls on the first excluded date, setting a first allowable date of the allowable dates that is before or after the first excluded date as the expiration date;

determining whether the default expiration time falls within a first excluded time interval of the excluded time intervals;

in response to determining that the default expiration time falls within the first excluded time interval, setting a first allowable time that falls within a first allowable time interval of the allowable time intervals as the expiration time;

after setting the first allowable date and the first allowable time, receiving a request to determine a new expiration date for the password;

in response to receiving the request, determining a first login date for the user;

if the first login date is later than the reset date:

determining a number of days between the first login date and the reset date; and shifting the first allowable date by the determined number of days to generate the new expiration date.

9. The method of claim 8, further comprising:

in response to determining that the default expiration date does not fall on the first excluded date, setting the default expiration date as the expiration date; and in response to determining that the default expiration time does not fall within the first excluded time interval, setting the default expiration time as the expiration time.

10. The method of claim 8, wherein determining the excluded dates and the excluded time intervals comprises:

analyzing one or more data items, wherein the one or more data items comprise data times that affect an ability of the user to perform the password reset before or on the expiration date and the expiration time;

determining a holiday schedule for the user;

identifying dates associated with the holiday schedule as excluded dates;

determining a time off schedule for the user;

identifying dates associated with the time off schedule as excluded dates;

determining a historical login behavior for the user;

identifying dates associated with a reduced login frequency as excluded dates;

determining a historical support desk engagement;

identifying dates associated with an elevate support desk engagement as excluded dates;

determining a maintenance schedule; and identifying dates associated with the maintenance schedule as excluded dates.

11. The method of claim 10, wherein determining the excluded dates and the excluded time intervals further comprises:

determining a weather forecast for the user;

identifying dates associated with weather events that may affect the user as excluded dates;

determining natural disaster information that may affect the user; and identifying dates affected by a natural disaster as excluded dates.

12. The method of claim 8, further comprising:

determining whether a request to determine the expiration date and the expiration time is received; and in response to determining that the request to determine the expiration date and the expiration time is received:

determining updated excluded dates and updated excluded time intervals;

determining updated allowable dates and updated allowable time intervals;

determining whether the expiration date falls on a first updated excluded date of the updated excluded dates;

in response to determining that the expiration date falls on the first updated excluded date, adjusting the expiration date to a first updated allowable date of the updated allowable dates that is before or after the first updated excluded date;

determining whether the expiration time falls within a first updated excluded time interval of the updated excluded time intervals; and in response to determining that the expiration time falls within the first updated excluded time interval, adjusting the expiration time to a time that falls within a first updated allowable time interval of the updated allowable time intervals.

13. The method of claim 12, wherein determining the updated excluded dates and the updated excluded time intervals comprises:

analyzing one or more data items, wherein the one or more data items comprise data times that affect an ability of the user to perform the password reset before or on the expiration date and the expiration time;

determining a holiday schedule for the user;

identifying dates associated with the holiday schedule as updated excluded dates;

determining a time off schedule for the user;

identifying dates associated with the time off schedule as updated excluded dates;

determining a historical login behavior for the user;

identifying dates associated with a reduced login frequency as updated excluded dates;

determining a historical support desk engagement;

identifying dates associated with an elevate support desk engagement as updated excluded dates;

determining a maintenance schedule; and identifying dates associated with the maintenance schedule as updated excluded dates.

14. The method of claim 13, wherein determining the updated excluded dates and the updated excluded time intervals further comprises:

determining a weather forecast for the user;

identifying dates associated with weather events that may affect the user as updated excluded dates;

determining natural disaster information that may affect the user; and identifying dates affected by a natural disaster as updated excluded dates.

15. A non-transitory computer-readable medium storing instructions that, when executed by one or more processors, cause the one or more processors to:

send a notification to a user device of a user that a password reset is required;

receive from the user device a hash of a password at a reset date and a reset time;

determine a default expiration date for the password based on the reset date;

determine a default expiration time for the password based on the reset time;

determine excluded dates, wherein the excluded dates comprise dates that are excluded from being an expiration date for the password;

determine excluded time intervals, wherein the excluded time intervals comprise times that are excluded from being an expiration time for the password;

determine allowable dates, wherein the allowable dates comprise dates that can be the expiration date for the password;

determine allowable time intervals, wherein the allowable time intervals comprise times that can be the expiration time for the password;

determine whether the default expiration date falls on a first excluded date of the excluded dates;

in response to determining that the default expiration date falls on the first excluded date, set a first allowable date of the allowable dates that is before or after the first excluded date as the expiration date;

determine whether the default expiration time falls within a first excluded time interval of the excluded time intervals;

in response to determining that the default expiration time falls within the first excluded time interval, set a first allowable time that falls within a first allowable time interval of the allowable time intervals as the expiration time;

after setting the first allowable date and the first allowable time, receive a request to determine a new expiration date for the password;

in response to receiving the request, determine a first login date for the user;

if the first login date is later than the reset date:

determine a number of days between the first login date and the reset date; and shift the first allowable date by the determined number of days to generate the new expiration date.

16. The non-transitory computer-readable medium of claim 15, wherein the instructions, when executed by the one or more processors, further cause the one or more processors to:

in response to determining that the default expiration date does not fall on the first excluded date, set the default expiration date as the expiration date; and in response to determining that the default expiration time does not fall within the first excluded time interval, set the default expiration time as the expiration time.

17. The non-transitory computer-readable medium of claim 15, wherein determining the excluded dates and the excluded time intervals comprises:

analyzing one or more data items, wherein the one or more data items comprise data times that affect an ability of the user to perform the password reset before or on the expiration date and the expiration time;

determining a holiday schedule for the user;

identifying dates associated with the holiday schedule as excluded dates;

determining a time off schedule for the user;

identifying dates associated with the time off schedule as excluded dates;

determining a historical login behavior for the user;

identifying dates associated with a reduced login frequency as excluded dates;

determining a historical support desk engagement;

identifying dates associated with an elevate support desk engagement as excluded dates;

determining a maintenance schedule; and identifying dates associated with the maintenance schedule as excluded dates.

18. The non-transitory computer-readable medium of claim 17, wherein determining the excluded dates and the excluded time intervals further comprises:

determining a weather forecast for the user;

identifying dates associated with weather events that may affect the user as excluded dates;

determining natural disaster information that may affect the user; and identifying dates affected by a natural disaster as excluded dates.

19. The non-transitory computer-readable medium of claim 15, wherein the instructions, when executed by the one or more processors, further cause the one or more processors to:

determine whether a request to determine the expiration date and the expiration time is received; and in response to determining that the request to determine the expiration date and the expiration time is received:

determine updated excluded dates and updated excluded time intervals;

determine updated allowable dates and updated allowable time intervals;

determine whether the expiration date falls on a first updated excluded date of the updated excluded dates;

in response to determining that the expiration date falls on the first updated excluded date, adjust the expiration date to a first updated allowable date of the updated allowable dates that is before or after the first updated excluded date;

determine whether the expiration time falls within a first updated excluded time interval of the updated excluded time intervals; and in response to determining that the expiration time falls within the first updated excluded time interval, adjust the expiration time to a time that falls within a first updated allowable time interval of the updated allowable time intervals.

20. The non-transitory computer-readable medium of claim 19, wherein determining the updated excluded dates and the updated excluded time intervals comprises:

analyzing one or more data items, wherein the one or more data items comprise data times that affect an ability of the user to perform the password reset before or on the expiration date and the expiration time;

determining a holiday schedule for the user;

identifying dates associated with the holiday schedule as updated excluded dates;

determining a time off schedule for the user;

identifying dates associated with the time off schedule as updated excluded dates;

determining a historical login behavior for the user;

identifying dates associated with a reduced login frequency as updated excluded dates;

determining a historical support desk engagement;

identifying dates associated with an elevate support desk engagement as updated excluded dates;

determining a maintenance schedule;

identifying dates associated with the maintenance schedule as updated excluded dates;

determining a weather forecast for the user;

identifying dates associated with weather events that may affect the user as updated excluded dates;

determining natural disaster information that may affect the user; and identifying dates affected by a natural disaster as updated excluded dates.

* * * * *